United States Patent
JianMing

(10) Patent No.: US 8,244,387 B2
(45) Date of Patent: Aug. 14, 2012

(54) OPERATION CONTROL METHOD, OPERATING DEVICE, AND CIRCUIT-BOARD WORKING APPARATUS

(75) Inventor: Ye JianMing, Anjo (JP)

(73) Assignee: Fuji Machine Mfg. Co., Ltd., Chiryu-shi (JP)

( * ) Notice: Subject to any disclaimer, the term of this patent is extended or adjusted under 35 U.S.C. 154(b) by 402 days.

(21) Appl. No.: 12/461,816

(22) Filed: Aug. 25, 2009

(65) Prior Publication Data

US 2010/0063633 A1    Mar. 11, 2010

(30) Foreign Application Priority Data

Sep. 9, 2008 (JP) .................................. 2008-231047

(51) Int. Cl.
*G05B 19/18* (2006.01)
*G05B 11/32* (2006.01)
(52) U.S. Cl. .......................................... 700/63; 700/280
(58) Field of Classification Search ............. 700/63–71, 700/117, 121, 280; 318/560
See application file for complete search history.

(56) References Cited

U.S. PATENT DOCUMENTS

| | | | | |
|---|---|---|---|---|
| 6,153,997 A * | 11/2000 | Kobayashi et al. | ........... | 318/560 |
| 6,462,501 B1 * | 10/2002 | Higo | ............................. | 318/651 |
| 6,842,651 B1 * | 1/2005 | Hashimoto | ..................... | 700/18 |
| 6,920,363 B2 * | 7/2005 | Otsuki et al. | .................... | 700/63 |
| 7,068,350 B2 * | 6/2006 | Nishi et al. | ....................... | 355/53 |
| 7,185,774 B2 * | 3/2007 | Colgate et al. | ................ | 212/331 |
| 7,727,051 B2 * | 6/2010 | Martin et al. | ................... | 451/11 |
| 7,778,716 B2 * | 8/2010 | Ueda et al. | ..................... | 700/63 |
| 2007/0038314 A1 * | 2/2007 | Cheng | ............................ | 700/63 |

FOREIGN PATENT DOCUMENTS

| JP | A-2004-272749 | | 9/2004 |
|---|---|---|---|
| JP | 2008085143 A | * | 4/2008 |

* cited by examiner

*Primary Examiner* — Dave Robertson
(74) *Attorney, Agent, or Firm* — Oliff & Berridge, PLC

(57) ABSTRACT

A method of controlling an operation of an operating member from a first position to a second position, wherein an operating speed of the operating member is initially increased from zero while an acceleration value of the operating member is first increased from zero and then decreased to zero, and the operating speed is subsequently decreased while the acceleration value is first decreased from zero and then increased to zero, and wherein a derivative of the acceleration value of the operating member is controlled such that the derivative during an acceleration increasing time and the derivative during an acceleration decreasing time are asymmetric with respect to each other. Also disclosed in an operating device including the operating member and a control device having an asymmetric control portion configured to practice the control method.

19 Claims, 11 Drawing Sheets

OPERATION CONTROL METHOD, OPERATING DEVICE, AND CIRCUIT-BOARD WORKING APPARATUS

CROSS REFERENCE TO RELATED APPLICATION

The present application claims the priority from Japanese Patent Application No. 2008-231047 filed Sep. 9, 2008, the disclosure of which is herein incorporated by reference in its entirety.

BACKGROUND OF THE INVENTION

1. Field of the Invention

The present invention relates to an operating device including an operating member driven by a drive device provided with a drive source, a method of controlling the operating member, and a circuit-board working apparatus including the operating member and a control device for controlling the operating member.

2. Description of Related Art

An operating device may include an operating member driven by a drive device provided with a drive source. In this type of operating device, an operating speed of the operating member during an operation thereof from a first position to a second position is initially smoothly increased from zero, subsequently smoothly reduced, and finally zeroed. JP-2004-272749 A discloses an example of such type of operating device wherein the operating member is an arm of a robot. A positioning control device described in this publication includes a letter-S position command generating portion configured to generate letter-S position commands according to which an acceleration value and an acceleration time of the robot arm are equal to an absolute value of a deceleration value and a deceleration time of the robot arm. A motor provided to operate the robot arm is controlled by the letter-S command generating portion, to control the position of the free end of the robot.

There also known positioning control devices wherein the letter-S position command generating portion is configured to generate letter-S position commands according to which the absolute value of the deceleration value is smaller than the acceleration value while the deceleration period is longer than the acceleration period, as indicated in FIG. 10, to reduce an impact and vibrations of the operating member upon its stopping, or letter-S position commands according to which the acceleration value and the deceleration value change along two sides of a triangle, to reduce an impact and vibrations of the operating member during the acceleration and deceleration of the operating member. There are also known positioning control devices wherein the letter-S position command generating portion is configured to generate letter-S position commands according to which the absolute value of the deceleration value is smaller than the acceleration value while the deceleration period is longer than the acceleration period, and the acceleration value and the deceleration value change along two sides of a triangle, as indicated in FIG. 11, to effectively reduce the vibrations upon stopping of the operating member and to assure a high degree of positioning accuracy of the operating member.

SUMMARY OF THE INVENTION

However, the inventor of the present invention found that there is still a room for improving the method of controlling the operation of the operating member on the basis of the letter-S position commands according to which the acceleration and deceleration values change along the two sides of the triangle as described above. The present invention was made in the light of this finding. It is therefore an object of the invention to further improve the control of the operating device.

The object indicated above can be achieved according to any one of the following modes of the present invention which will be described for illustrative purpose and each of which is numbered like the appended claims and depends from the other mode or modes, where appropriate, for easier understanding of technical features disclosed in the present application, and possible combinations of those features. However, it is to be understood that the invention is not limited to those technical features or combinations thereof, and that any one of a plurality of technical features described below with respect to any one mode of the invention may be a subject of the present invention, without the other technical feature or features being combined with that one feature.

(1) A method of controlling an operation of an operating member from a first position to a second position, comprising initially increasing an operating speed of the operating member from zero while increasing an acceleration value of the operating member from zero and then decreasing the acceleration value to zero, and subsequently decreasing the operating speed while decreasing the acceleration value from zero and then increasing the acceleration value to zero, wherein an improvement comprising:

controlling a derivative of the acceleration value of the operating member such that the derivative during an acceleration increasing time during which the acceleration value is increased and the derivative during an acceleration decreasing time during which the acceleration value is decreased are asymmetric with respect to each other.

In the prior art method of controlling the operation of the operating member, the acceleration increasing time and the acceleration decreasing time are equal to each other, and highest values of an absolute value of the derivative during the acceleration increasing and decreasing times are equal to each other, so that a shape of a graph indicating a change of the derivative of the acceleration value is symmetric with respect to a midpoint intermediate between the acceleration increasing and decreasing times, at which the derivative is zero. According to the above-described mode (1) of present invention, the derivative values during the acceleration increasing and decreasing times are controlled to be asymmetric with respect to each other. Namely, the derivative of the acceleration value is controlled such that the shape of the above-indicated graph is asymmetric with respect to the above-indicated midpoint, in the present mode (1) of the invention. The above-described mode (1) may be configured such that the acceleration increasing time and the acceleration decreasing time are made different from each other, and such that the highest value of the absolute value of the derivative during the acceleration increasing time and the highest value of the absolute value of the derivative during the acceleration decreasing time are made different from each other.

In the control method according to the above-described mode (1) of this invention wherein the derivative values during the acceleration increasing and decreasing times are controlled to be asymmetric with respect to each other, the freedom of control of the derivative of the acceleration value of the operating member, and the freedom of control of the acceleration value are increased, making it possible to improve the control of an operating device including the operating member, as compared with the conventional control method.

For example, the impact and vibrations of the operating member upon stopping at the second position can be effectively reduced, by controlling the derivative values during the acceleration increasing and decreasing times to be asymmetric with each other such that the acceleration increasing time of the deceleration period is made longer than the acceleration decreasing time of the deceleration period, to reduce the absolute value of the acceleration value (deceleration value) and the absolute value of the derivative of the acceleration value when the operating member is brought into a stop at the second position. Where the acceleration values during the acceleration increasing and decreasing times are controlled to be asymmetric with respect to each other such that the deceleration period is longer than the acceleration period as described above, the impact and vibrations upon stopping of the operating member can be further reduced.

(2) The method according to the above-described mode (1), wherein an operation of controlling the derivative of the acceleration value of the operating member comprises at least one of a control arrangement to control the derivative of the acceleration value such that an absolute value of the derivative during the acceleration increasing time of an acceleration period during which the operating speed of the operating member is increased from zero is smaller than an absolute value of the derivative during the acceleration decreasing time of the acceleration period, and a control arrangement to control the derivative of the acceleration value such that an absolute value of the derivative during the acceleration increasing time of a deceleration period during which the operating speed is decreased to zero is smaller than an absolute value of the derivative during the acceleration decreasing time of the deceleration period.

If the absolute value of the derivative of the acceleration value of the operating member during the acceleration increasing time of the acceleration period is controlled to be smaller than that of the derivative during the acceleration decreasing time of the acceleration period, the impact and vibrations of the operating member upon starting of the operation from the first position can be reduced. If the absolute value of the derivative during the acceleration increasing time (deceleration decreasing time) of the deceleration period is controlled to be smaller than that of the derivative during the acceleration decreasing time (deceleration increasing time) of the acceleration period, the impact and vibrations of the operating member upon stopping of the operation at the second position can be reduced.

(3) The method according to the above-indicated mode (1) or (2), wherein an operation of controlling the derivative of the acceleration value of the operating member comprises holding the derivative constant at a predetermined first value during the acceleration increasing time and at a predetermined second value during the acceleration decreasing time.

The absolute value of the derivative may be controlled to change along a straight line, two sides of a triangle, a trigonometric function curve, a high-order function curve, etc. To achieve the object of this invention with a low computing load, however, it is effective to hold the derivative constant at the two predetermined different values during the respective acceleration increasing and decreasing times.

(4) The method according to any one of the above-described modes (1)-(3), wherein an operation of controlling the derivative of the acceleration value of the operating member comprises controlling the acceleration value of the operating member such that a highest value of an absolute value of the acceleration value during the deceleration period is smaller than a highest value of an absolute value of the acceleration value during the acceleration period.

The method according to the above-described mode (4) which includes the feature or features of the above-described modes (1)-(3) permits an increased degree of freedom of control of the operating member, and more effective achievement of the object of the present invention.

(5) The method according to any one of the above-described modes (1)-(4), wherein the operating member is a linearly movable member movable along a straight line, and the operating speed of the operating member is a linearly moving speed of the linearly movable member.

(6) The method according to any one of the above-described modes (1)-(4), wherein the operating member is a rotatable member rotatable about an axis, and the operating speed of the operating member is a rotating speed of the rotatable member.

(7) An operating device comprising:

an operating member operable to have a predetermined path of operation;

a drive device including a drive source and operable to drive the operating member; and a control device configured to control the drive source for operating the operating member from a first position to a second position, such that an operating speed of the operating member is initially increased from zero while an acceleration value of the operating member is increased from zero and then decreased to zero, and is subsequently decreased while the acceleration value is decrease from zero and then increased to zero, wherein the control device includes an asymmetric control portion configured to control the drive device for controlling a derivative of the acceleration value of the operating member such that the derivative during an acceleration increasing time during which the acceleration value is increased and the derivative during an acceleration decreasing time during which the acceleration value is decreased are asymmetric with respect to each other.

A deceleration period during which the operating speed of the operating member is decreased may be immediately followed by an acceleration period during which the operating speed is increased from zero. Alternatively, a constant-speed period during which the operating speed is held constant may follow the acceleration period and precede the deceleration period. The control apparatus of the operating device according to the above-described mode (7) of the invention is operable to practice the method according to the above-described mode (1) of the invention.

The control device of the operating device according to the above-described mode (7) may have at least one of the features according to the above-described modes (2)-(6).

(8) A circuit-board working apparatus comprising:

a board holding device configured to hold a circuit board;

a working head configured to perform a working operation on the circuit board held by the board holding device; and a moving device configured to move the working head and the circuit board held by the board holding device, relative to each other, and wherein the moving device includes:

a movable member which holds one of the working head and the board holding device and which is movable to move the above-indicated one of the working head and the board holding device;

a drive device including a drive source and operable to drive the movable member; and a control device configured to control the drive source for moving the movable member from a first position to a second position, such that an operating speed of the movable member is initially increased from zero while an acceleration value of the movable member is increased from zero and then decreased to zero, and is subsequently decreased while the acceleration value is decrease from zero and then increased to zero, wherein the control device includes an asymmetric control portion configured to control the drive source for controlling a derivative of the acceleration value of the movable member such that the derivative during an acceleration increasing time during which the acceleration value is increased and the derivative during an acceleration decreasing time during which the acceleration value is decreased are asymmetric with respect to each other.

The circuit-board working apparatus is typically an electronic-circuit-component mounting apparatus described below with respect to the following mode (9), but is not limited to the electronic-circuit-component mounting apparatus. For instance, the circuit-board working apparatus according to the present invention may be an adhesive dispenser arranged to deliver an adhesive or any other highly viscous fluid to a predetermined spot or spots (usually to a plurality of spots) on the circuit board. Alternatively, the circuit-board working device may be a physical-state detecting apparatus which includes an imaging device arranged to obtain an image of a predetermined area or areas (usually a plurality of areas) on the circuit board and which is provided to detect a physical state or condition of the circuit board, or an inspecting apparatus which has an inspecting probe for contact with a predetermined area or areas (usually a plurality of areas) on the circuit board, for electrical inspection of the circuit board. The principle of the present invention is equally applicable to any other types of the circuit-board working apparatus.

The circuit-board working apparatus according to the above-described mode (8) may have at least one of the features according to the above-described modes (2)-(6).

(9) The circuit-board working apparatus according to the above-described mode (8), wherein the working head is a mounting head configured to mount electronic circuit components on the circuit board held by the board holding device, and the movable member includes at least one of (a) a first movable member movable in one of an X-axis direction and a Y-axis direction, in a plane parallel to a plane of the circuit board held by the board holding device, and (b) a second movable member which is movable on the first movable member, in the other of the X-axis and Y-axis directions, and which holds the mounting head, and wherein the drive device of the moving device drives the above-indicated at least one of the first and second movable members, and the asymmetric control portion controls the drive source of the drive device.

BRIEF DESCRIPTION OF THE DRAWINGS

The above and other objects, features, advantages and technical and industrial significance of the present invention will be better understood by reading the following detailed description of a preferred embodiment of the present invention, when considered in connection with the accompanying drawings, in which:

FIG. 9A is a graph indicating a result of the experiment according to the prior art, while

DETAILED DESCRIPTION OF THE PREFERRED EMBODIMENT

Figure 1:
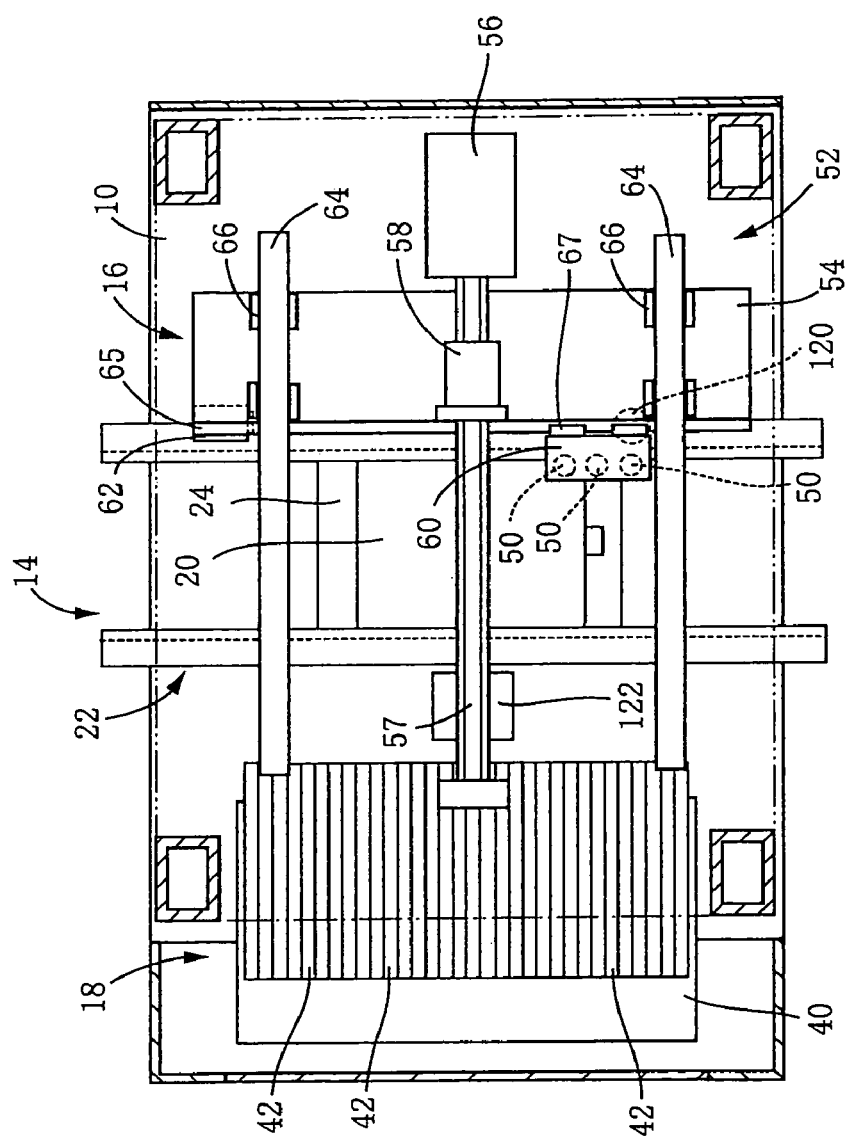
FIG. 1 is a schematic plan view of an electronic-circuit-component mounting machine constructed according to one embodiment of the present invention.

Referring to the drawings, the preferred embodiment of this invention will be described in detail. It is to be understood that the following preferred embodiment is given for illustrative purpose only, and that the present invention may be embodied with various changes and modifications which may occur to those skilled in the art in the light of the various modes of the invention described above in the SUMMARY OF THE INVENTION.

Referring first to the schematic plan view of FIG. 1, there is shown an electronic-circuit-component mounting machine (hereinafter referred to as "component mounting machine"), which is an example of a circuit-board working apparatus. The schematic plan view shows the component mounting machine when its upper frame is removed. The component mounting machine includes a base 10, and a board conveying and holding device 14, a component mounting device 16 and a component supplying device that are disposed on the base 10. The board conveying and holding device 14 includes a board conveyor 22 for conveying a circuit board in the form of a printed-wiring board 20, and a board holding device 24 for positioning and holding the printed-wiring board 20 at a predetermined position to which the printed-wiring board 20 is conveyed by the board conveyor 22. The component mounting device 16 receives electronic-circuit components 30 (hereinafter referred to as "circuit components 30") from the component supplying device 18, and mount the circuit components 30 at respective predetermined positions on the printed-wiring board 20 which has been conveyed and positioned and held at the predetermined position by the board conveying and holding device 14, so that a desired printed-circuit board is fabricated as an electronic-circuit board. One of the circuit components 30 received by the component mounting device 16 is shown in FIG. 2. The printed-wiring board 20 is conveyed by the board conveying and holding device 14 in an X-axis direction, while the circuit components 30 are supplied from the component supplying device 18 in a Y-axis direction perpendicular to the X-axis direction. The X-axis and Y-axis directions indicated in FIG. 1 define a horizontal plane, which is parallel to the plane of the plan view of FIG. 1.

The component supplying device 18 includes a feeder support 40 fixed to the base 10, and a plurality of component feeders 42 (hereinafter referred to as "feeders 42") which are removably mounted on the feeder support 40 such that component supply portions of the feeders 42 are arranged in the X-axis direction. Each of the feeders 42 is configured to feed a tape accommodating the circuit components 30 in a row, such that the tape is fed to position each circuit component 30 at the position of its predetermined component supply portion. However, the component supplying device 18 may employ a bulk feeder or any other type of feeding device in place of the plurality of feeders 42. The bulk feeder is arranged to accommodate the circuit components in a bulk, arrange the circuit components in a line, and supply the circuit components one after another.

Figure 2:
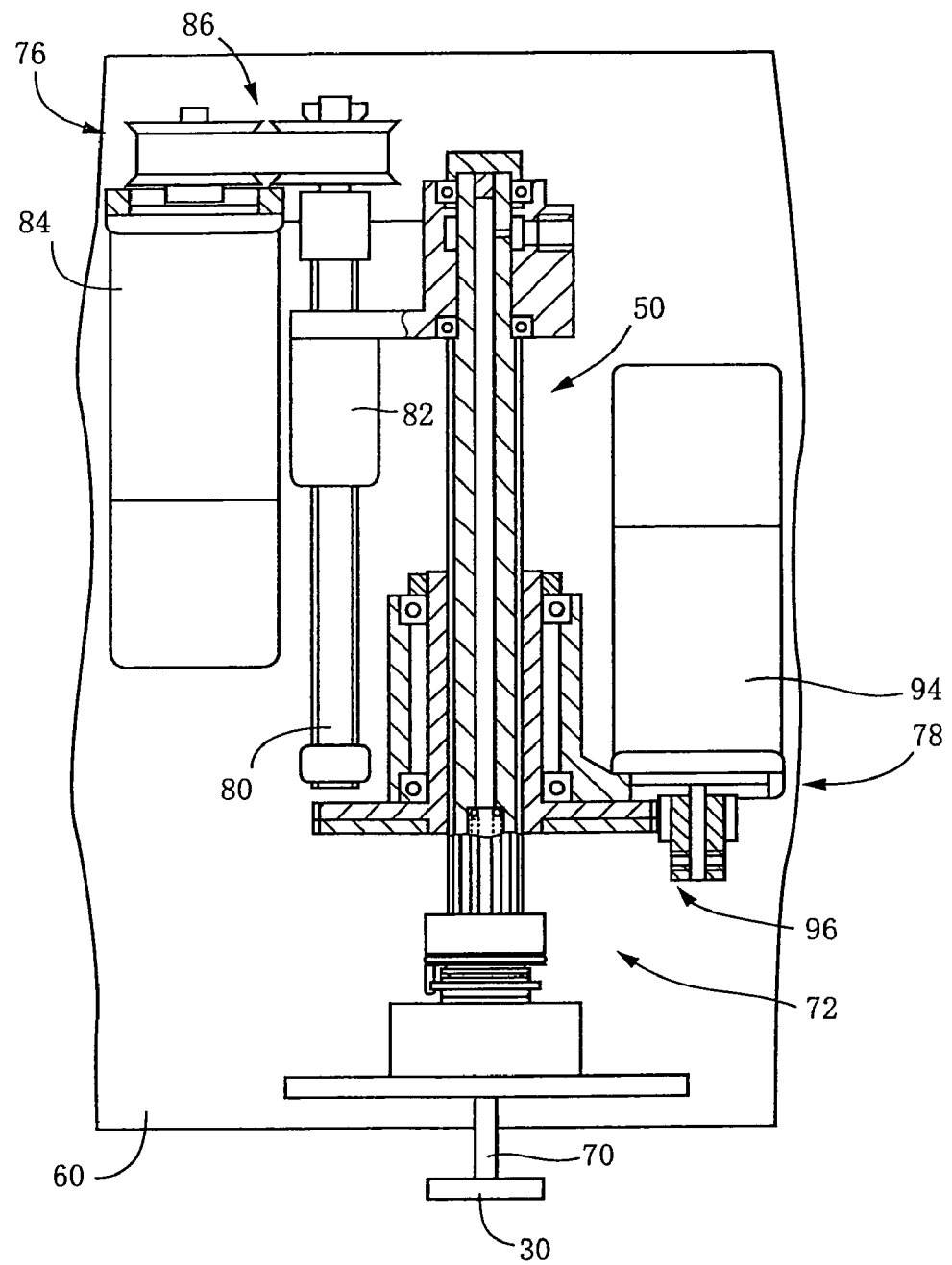
FIG. 2 is a front elevational view partly in cross section showing one of component holder heads of the electronic-circuit-component mounting machine, and portions of the machine near the component holder head.

The component mounting device 16 includes three component holder heads 50, as indicated by broken lines in FIG. 1. Each of the component holder heads 50 is movable in the X-axis and Y-axis directions in the horizontal plane, to the positions of the component supply portions of the feeders 42, to receive the circuit components 30 from the component supply portions. The component mounting device 16 is provided with an XY feeding device 52 including: a Y-axis drive device having a Y-axis slide 54, a Y-axis drive motor 56, a Y-axis feedscrew 57, a Y-axis nut 58; an X-axis drive device having an X-axis slide 60, an X-axis drive motor 62, an X-axis feedscrew (not shown) and an X-axis nut (not shown); and a guiding device having guide rails 64, 65 and guide blocks 66, 67 for guiding the Y-axis slide 54 and the X-axis slide 60. The XY feeding device 52 as a whole is held by the upper frame (not shown in FIG. 1), with the guide rails 64, Y-axis drive motor 56, etc. being fixed to the upper frame.

The X-axis slide 60 has a vertically extending side wall on which the three component holder heads 50 are disposed, as shown in FIG. 1, such that the component holder heads 50 are arranged in the X-axis direction in which the feeders 42 are arranged, and such that each of the component holder heads 50 is vertically movable and rotatable. One of the three component holder heads 50 all of which have the same construction is shown in FIG. 2, by way of example. The X-axis slide 60 is movable by the XY feeding device 52 to move each component holder heads 50 to a desired position in the horizontal plane. As shown in FIG. 2, each component holder head 50 includes a suction nozzle 70 for holding the circuit component 30 by suction under a reduced pressure, and a nozzle holder 72 for holding the suction nozzle 70 such that the suction nozzle 70 is removable from the nozzle holder 72. On the X-axis slide 60, there are also disposed an elevating and lowering device 76 operable to vertically move the nozzle holder 72 (component holder head 50) in a Z-axis direction, and a rotating device 78 operable to rotate each component holder head 50 about its axis. The Z-axis direction in which the component holder head 50 is movable is perpendicular to the X-axis and Y-axis directions. The elevating and lowering device 76 provided in the present embodiment includes a feedscrew 80 rotatably supported by the X-axis slide 60, a nut 82 which engages the feedscrew 80 and which is fixed to the nozzle holder 72, a Z-axis drive motor 84 provided as a Z-axis drive source, and a rotary motion transmission device 86 which includes driving and driven pulleys and a timing belt and which is arranged to transmit a rotary motion of the Z-axis drive motor 84 to the feedscrew 80. The rotating device 78 includes a θ-axis drive motor 94 provided as a θ-axis drive source, and a rotary motion transmission device 96 which includes driving and driven gears and which is arranged to transmit a rotary motion of the θ-axis drive motor 94 to the component holder head 50.

As shown in FIG. 1, the X-axis slide 60 carries a fiducial-mark camera 120 in the form of a CCD camera fixedly disposed thereon as an imaging device. The fiducial-mark camera 120 is provided to obtain images of a plurality of fiducial marks provided on the printed-wiring board 20. Before an operation to mount the circuit components 30 on the printed-wiring board 20, the fiducial-mark camera 120 is moved to a predetermined position above the printed-wiring board 20 positioned and held by the board holding device 24, and is operated to obtain image data representative of the images of the fiducial marks. The obtained image data are processed by an image processing computer 166 (shown in FIG. 3), to detect errors of actual positions of the fiducial marks with respect to their nominal positions. These positioning errors of the fiducial marks which represent positioning errors of the printed-wiring board 20 are stored in a board-positioning-error memory of a RAM 156 of a control device 150 which will be described. The stored positioning errors are used to implement compensation of the positions of the X-axis slide 60 at which the component holder heads 50 are operated to mount the circuit components 30 on the printed-wiring board 20.

In a path of movement of each component holder head 50 from the selected feeder 42 to the printed-wiring board 20 held by the board holding device 24, to mount on the printed-wiring board 20 the circuit component 30 received from the selected feeder 42, there is disposed a component camera 122 in the form of a CCD camera as another imaging device. This component camera 122 is provided to obtain image data representative of an image of the circuit component 30 held by the component holder head 50, as viewed in the upward direction toward the lower surface of the circuit component 30. The image data are processed by the above-described image processing computer 166, to detect an error of an actual position of the circuit component 30 with respect to its nominal position on the component holder head 50. This positioning error of the circuit component 30 is stored in a component-positioning-error memory of the RAM 156 of the control device 150. The stored positioning error is used to implement compensation of the positions of the X-axis slide 60 at which the component holder head 50 is operated to mount the circuit component 30 on the printed-wiring board 20. At least one of the fiducial-mark camera 120 and the component camera 122 may be a line sensor rather than the CCD camera.

Figure 3:
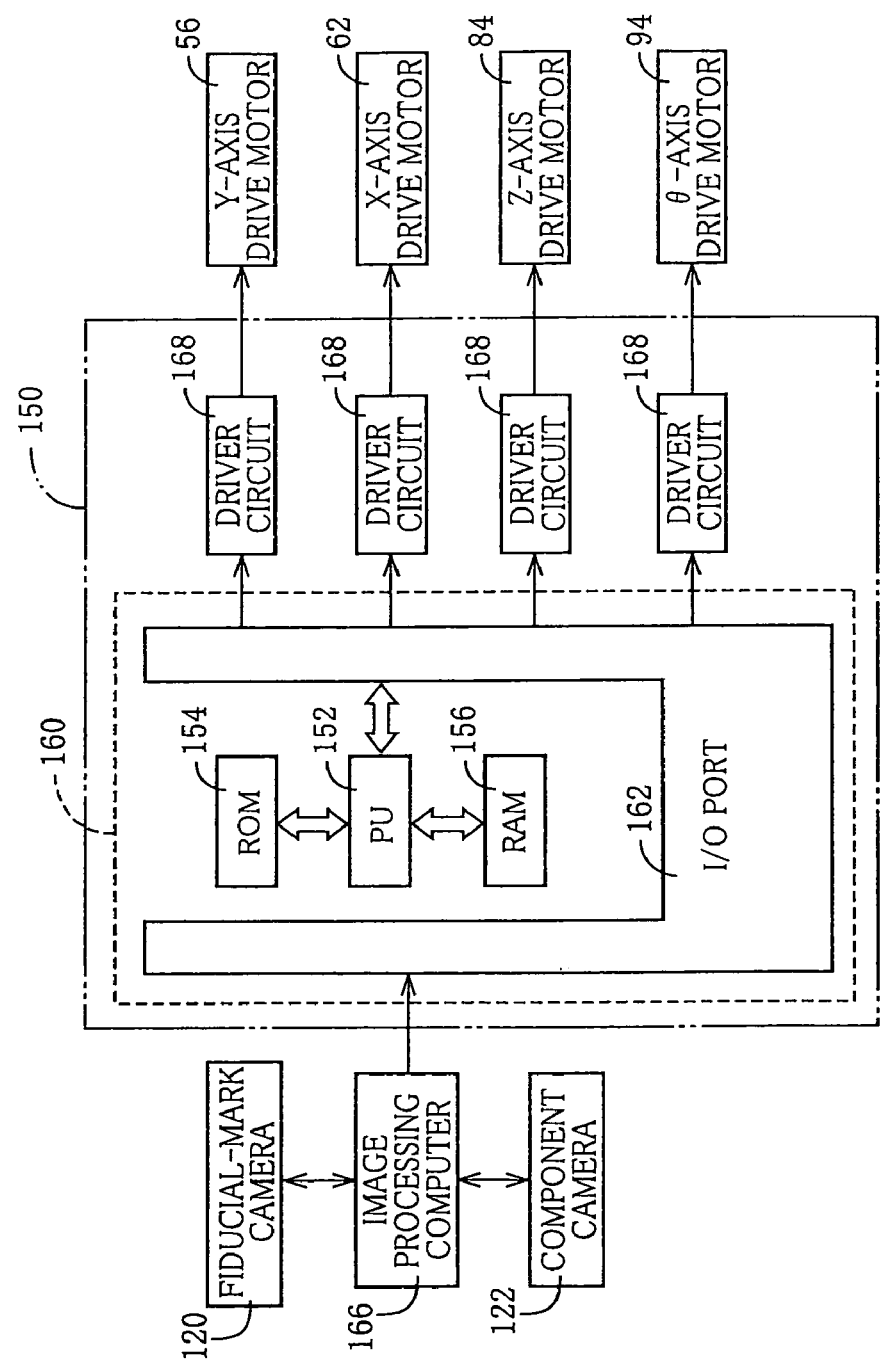
FIG. 3 is a block diagram showing a control device of the electronic-circuit-component mounting machine.

The present component mounting machine is provided with the above-indicated control device 150 shown in FIG. 3. The control device 150 is principally constituted by a computer 160 incorporating the above-indicated PU (processing unit) 152, a ROM 154, the above-indicated RAM 156, and a bus connecting the PU 152, ROM 154 and RAM 156 to each other. To the bus, there is connected an I/O port 162 to which there are connected: the above-indicated image processing computer 166 provided to process the image data obtained by the fiducial-mark camera 120 and component camera 122; encoders of the above-described Y-axis drive motor 56, X-axis drive motor 62, Z-axis drive motor 84 and θ-axis drive motor 94; various detectors and computers; and the Y-axis, X-axis, Z-axis and θ-axis drive motors 56, 62, 84, 94 through respective driver circuits 168. The Y-axis, X-axis, Z-axis and θ-axis drive motors 56, 62, 84, 94 are drive sources in the form of servomotors operable as electric motors capable of controlling an angle of rotation with a high degree of accuracy. The ROM 154 stores control programs such as those for control routines to mount the circuit components 30 on the printed-wiring board 20, and those for controlling various operations of the component mounting machines. The RAM 156 stores programs for moving the component holder heads 50 according to kinds, mounting positions and mounting orders of the circuit components 30.

The operations of the present component mounting machine will be briefly described. The XY feeding device 52 is operated to move the component holder heads 50 to position the suction nozzles 70 at the component supply portions of the feeders 42 of the component supplying device 18. The suction nozzles 70 are elevated to pick up the circuit components 30 from the feeders 42. The component holder heads 50 are moved by the XY feeding device 52, to move the suction nozzles 70 holding the circuit components 30, to the positions right above the predetermined mounting positions on the printed-wiring board 20 held and positioned by the board holding device 24. The suction nozzles 70 are lowered and elevated to mount the circuit components 30 on the printed-wiring board 20. Before the circuit components 30 are mounted on the printed-wiring board 20, the image data representative of the images of the fiducial marks on the printed-wiring board 20 are obtained by the fiducial-mark camera 120 to detect the positioning error of the printed-wiring board 20 positioned by the board holding device 24, and the image data representative of the images of the circuit components 30 held by the suction nozzles 70 are obtained by the component camera 122 to detect the positioning errors of the circuit components 30 positioned by the suction nozzles 70, namely, center position errors of each circuit component 30 in the X-axis and Y-axis directions and angular position errors of the circuit component 30. The X-axis slide 60 is positioned to compensate for the positioning error of the printed-wiring board 20, and each suction nozzle 70 is rotated to compensate for the positioning error of the corresponding circuit component 30. Thus, the circuit components 30 are picked up by the component holder heads 50, and are mounted on the printed-wiring board 20 by the component holder heads 50, to fabricate the printed-circuit board.

For the component mounting machine to operate to mount the circuit components 30 on the printed-wiring board 20 as described above, each of the Y-axis slide 54 and the X-axis slide 60 must be moved from a present first position to a second position at which the Y-axis slide 54 or the X-axis slide 60 is to be stopped next. Further, the nozzle holder 72 of each component holder head 50 must be moved from a first position which is the fully elevated position, to a second position which is a lowered position at which the suction nozzle 70 receives the circuit component 30 from the component supplying device 18 or mounts the circuit component 30 on the printed-wiring board 20. The fully elevated position of the nozzle holder 72 is usually fixed, while on the other hand the lowered position is not fixed. In particular, the lowered position at which the suction nozzle 70 mounts the circuit components 30 on the printed-wiring board 20 usually varies depending upon the height of the circuit components 30. In addition, the nozzle holder 72 (suction nozzle 70) must be rotated from a present first angular position to a second angular position. Therefore, the Y-axis drive motor 56, X-axis drive motor 62, Z-axis drive motor 84 and θ-axis drive motor 94 must be controlled by the control device 150, to horizontally move each of the Y-axis and X-axis slides 54, 60 from the first position to the second position, to vertically move the nozzle holder 72 from the first position to the second position, and to rotate the nozzle holder 72 from the first angular position to the second angular position. The principle of the present invention applies to the operation to control the drive motors 56, 62, 84, 94. It will be understood that the Y-axis and X-axis slides 54, 60 and the nozzle holder 72 are linearly movable members each of which is movable along a straight line, while the nozzle holder 72 is a rotatable member rotatable about the θ axis.

To improve the efficiency of the mounting operation of the circuit components 30 and to improve the accuracy of the mounting positions of the circuit components 30, the operating members in the form of the Y-axis slide 54, X-axis slide 60 and nozzle holder 72 must be moved or rotated to the second position at a speed as high as possible, and with a high degree of positioning accuracy. In particular, the accuracy of the mounting positions is influenced by the positioning accuracy at the second position at which the movement or rotation is stopped, so that the positioning accuracy at the second position is important. At the same time, it is also necessary to reduce an impact and vibrations of the operating members upon starting of the operation (movement or rotation), for reducing the operating noise of the component mounting machine and for preventing reduction of its service life. The drive motors 56, 62, 84, 94 are controlled according to letter-S position commands. Actually, the letter-S position commands must be determined by taking account of masses and specifications (rigidity, and natural frequency, etc.) of the drive devices to be driven according to the letter-S position commands; masses and specifications of the operating members and loads that are moved or rotated with the operating members; an amount of operation (distance of movement or angle of rotation) of the operating members from the first position to the second position; and a desired operating time of the operating members allowed for the operation. The operation to control the Y-axis drive motor 56 which is the drive source of the Y-axis slide drive device to move the Y-axis slide 54 will be described by way of example. The operation to control the other drive motors 62, 84, 94 is identical in principle with the operation to control the Y-axis drive motor 56.

Figure 4:
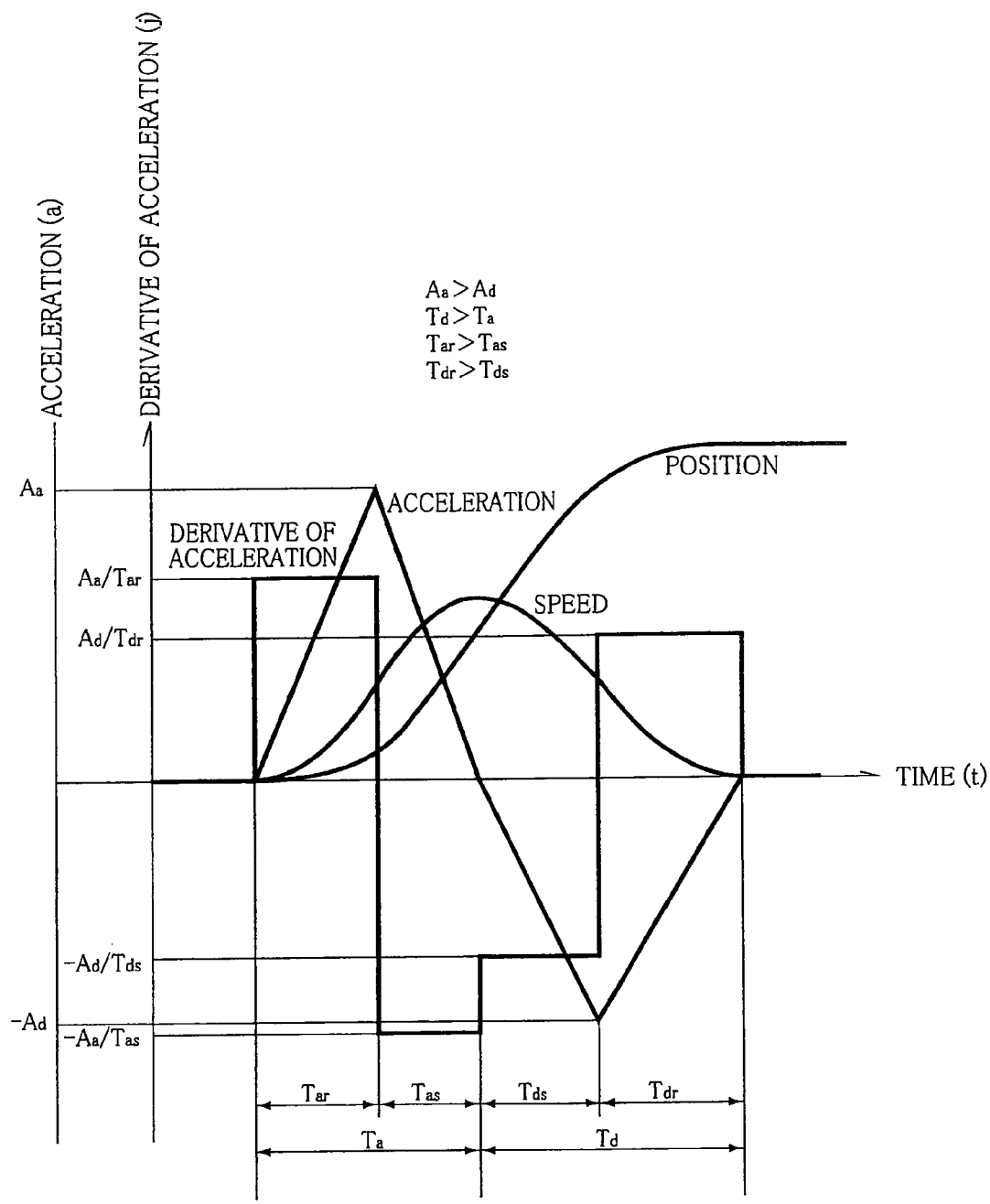
FIG. 4 is a graph indicating one example of a control operation of a Y-axis drive motor by the control device.

A portion of the control device 150 which is assigned to control the Y-axis drive motor 56 generates the letter-S position commands on the basis of a change of a derivative of an acceleration value indicated in FIG. 4. Where the distance of movement from the first position to the second position is long enough for the acceleration value "a", a deceleration value "–a" and a speed "v" to reach their upper limits (that are principally determined by the capacity of the Y-axis drive motor 56, and the mass of the Y-axis slide 54, and the masses of the X-axis slide 60, X-axis slide drive device, nozzle holder 72, elevating and lowering device 76, component holder heads 50, rotating device 78, which are moved together with the Y-axis slide 54), the letter-S position commands are generated as described below by reference to FIG. 7. In the example of FIG. 4, the distance of movement from the first position to the second position is not long enough for the acceleration value "a", deceleration value "–a" and speed "v" to reach their upper limits. In this case, the control operation of the Y-axis drive motor 56 is more adequately performed according to the principle of the present invention, and asymmetric arrangements of the acceleration value and the derivative of the acceleration value can be more easily recognized. In this sense, the example of FIG. 4 will be first discussed.

When $A_a$ represents a highest value of the acceleration value "a" during an acceleration period $T_a$ while $A_d$ represents a highest value (positive value) of the deceleration value "–a" (positive value) during a deceleration period $T_d$, $A_a/T_{ar}$ represents a derivative "j" of the acceleration value "a" during an acceleration increasing time $T_{ar}$ of the acceleration period $T_a$, $-A_a/T_{as}$ represents the derivative "j" during an acceleration decreasing time $T_{as}$ of the acceleration period $T_a$, $-A_d/T_{ds}$ represents the derivative "j" during an acceleration decreasing time $T_{ds}$ of the deceleration period $T_d$, and $A_d/T_{dr}$ represents the derivative "j" during an acceleration increasing time $T_{dr}$ of the deceleration period $T_d$. In the present embodiment, the acceleration period $T_a$ is shorter than the deceleration period $T_d$, and the highest value $A_a$ of the acceleration value "a" is larger than the highest value $A_d$ of the deceleration value "−a".

Since the speed "v" must be zeroed at the end of the deceleration period $T_d$, an integral value of the acceleration value "a" during the acceleration period $T_a$ must be offset by an integral value of the deceleration value "−a" during the deceleration period $T_d$. Accordingly, one of a control arrangement to control the acceleration period $T_a$ to be shorter than the deceleration period $T_d$ and a control arrangement to control the highest value $A_a$ of the acceleration value "a" to be larger than the highest value $A_d$ of the deceleration value "−a" necessarily results in the other of the two control arrangements.

The present embodiment is further arranged such that the acceleration increasing time $T_{ar}$ is longer than the acceleration decreasing time $T_{as}$, while the derivative $A_a/T_{ar}$ during the acceleration increasing time $T_{ar}$ is smaller than the absolute value $A_a/T_{as}$ of the derivative $-A_a/T_{as}$ during the acceleration decreasing period $T_{as}$, and such that the acceleration increasing time $T_{dr}$ is longer than the acceleration decreasing time $T_{ds}$, while the derivative $A_d/T_{dr}$ during the acceleration increasing time $T_{dr}$ is smaller than the absolute value $A_d/T_{ds}$ of the derivative $-A_d/T_{ds}$ during the acceleration decreasing period $T_{ds}$.

The acceleration value "ea" must be zeroed at the end of the acceleration decreasing time $T_{as}$. Therefore, an integral value of the derivative "j" during the acceleration increasing time $T_{ar}$ must be offset by an integral value of the derivative "j" during the acceleration decreasing time $T_{as}$. Accordingly, one of a control arrangement to control the acceleration increasing time $T_{ar}$ to be longer than the acceleration decreasing time $T_{as}$ and a control arrangement to control the derivative $A_a/T_{ar}$ to be smaller than the absolute value $A_a/T_{as}$ of the derivative $-A_a/T_{as}$ necessarily results in the other of the two control arrangements. This is also true for the deceleration period $T_d$.

Figure 5:
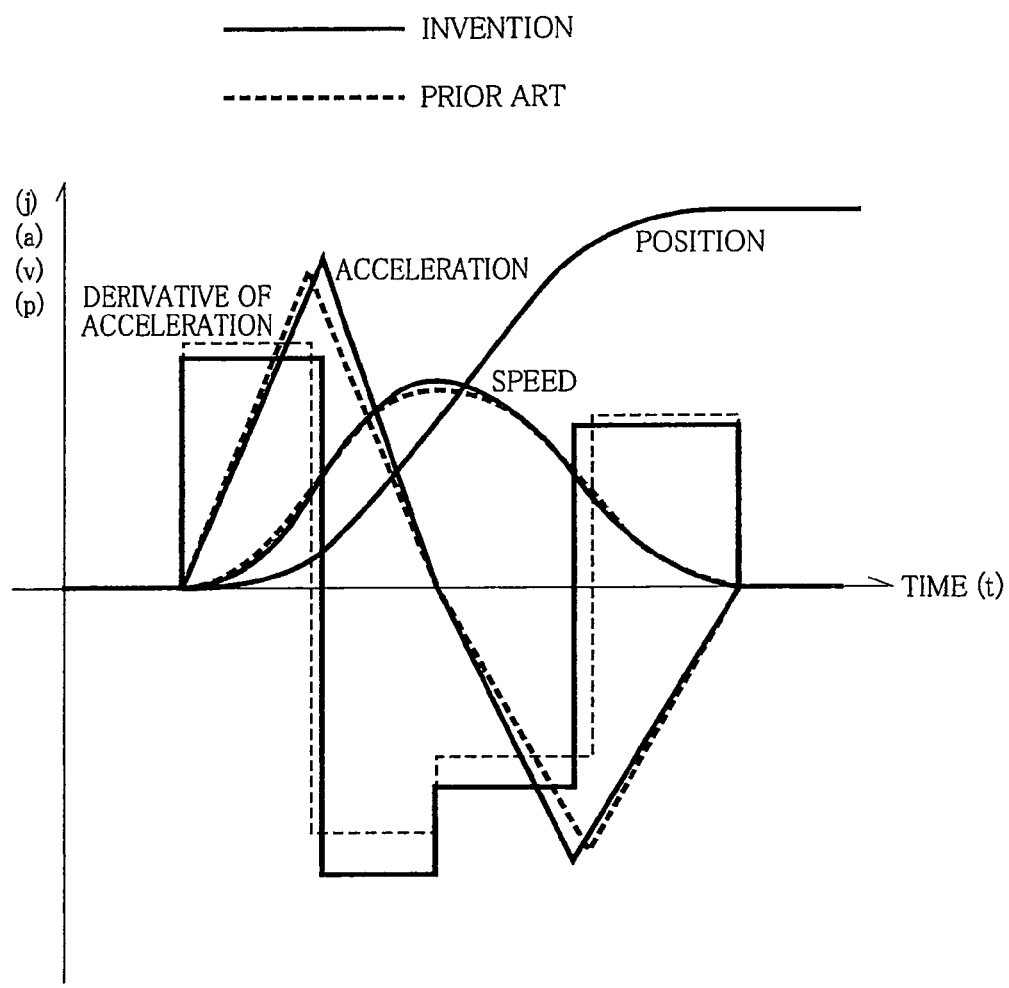
FIG. 5 is a graph indicating the control operation of the Y-axis drive motor by the control device, as compared with the prior art control.

The graph of FIG. 5 shows the above-indicated control arrangements according to the present embodiment, in comparison with the symmetric arrangements in the prior art wherein the acceleration increasing time $T_{ar}$ is equal to the acceleration decreasing time $T_{as}$ while the acceleration increasing time $T_{dr}$ is equal to the acceleration decreasing time $T_{ds}$, and the derivative $A_a/T_{ar}$ is equal to the absolute value $A_a/T_{as}$ of the derivative $-A_a/T_{as}$ while the derivative $A_d/T_{dr}$ is equal to the absolute value $A_d/T_{ds}$ of the derivative $-A_d/T_{ds}$.

The impact and vibrations of the Y-axis slide 54 upon starting of the movement from the first position can be reduced by controlling the derivative $A_a/T_{ar}$ to be smaller than the absolute value $A_a/T_{as}$ of the derivative $-A_a/T_{as}$, as described above. Further, the impact and vibrations of the Y-axis slide 54 upon stopping at the second position can be reduced by controlling the derivative $A_d/T_{dr}$ to be smaller than the absolute value $A_d/T_{ds}$ of the derivative $-A_d/T_{ds}$. In the present embodiment, the highest value $A_d$ of the deceleration value "−a" is made smaller than the highest value $A_a$ of the acceleration value "a", so that the derivative $A_d/T_{dr}$ and the deceleration value "−a" upon stopping of the Y-axis slide 54 can be further reduced, making it possible to reduce the impact and vibrations of the Y-axis slide 54 at and around the second position and to improve the positioning accuracy of the Y-axis slide 54 at the second position and the positioning accuracy of the suction nozzle 70, without having to prolong the time of movement from the first position to the second position.

Figure 6:
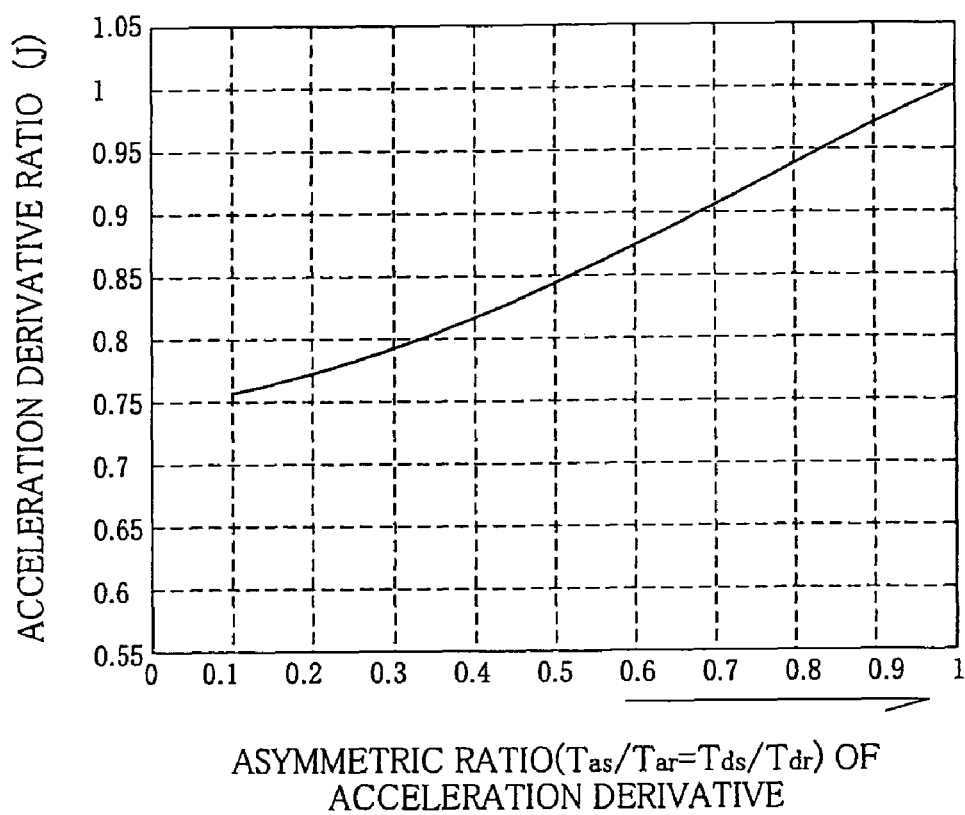
FIG. 6 is a graph for explaining the control operation by the control device.

It will be understood from the foregoing descriptions that the time and distance of the movement and an asymmetric ratio $(T_a/T_d)$ of the acceleration period $T_a$ to the deceleration period $T_d$ are constant, an asymmetric ratio $(T_{as}/T_{ar}=T_{ds}/T_{dr})$ of the derivative "j" has a predetermined relationship with the derivative "j", so that a change of the asymmetric ratio of the derivative "j" permits a change of a ratio "J" of the derivative $A_a/T_{ar}$ or $A_d/T_{dr}$ according to the asymmetric arrangements to the derivative $A_a/T_{ar}$ or $A_d/T_{dr}$ according to the symmetric arrangements, as indicated in the graph of FIG. 6. Accordingly, the freedom of design of the control operation of the Y-axis drive motor 56 is increased. Theoretically, the derivative "j" during the deceleration period $T_d$ can be reduced to effectively reduce the impact and vibrations of the Y-axis slide 54, by increasing the acceleration increasing time $T_{dr}$. Actually, however, it is desirable to control the asymmetric ratio to an adequate value by simulation or experimentation, in view of influences of the natural vibrations of the members between the Y-axis drive motor 56 and the suction nozzle 70 and an influence of the asymmetric arrangements, on the positioning accuracies of the members moved by the Y-axis drive motor 56, in particular, the positioning accuracy of the suction nozzle 70 that influences the mounting accuracy of the circuit components 30.

Figure 7:
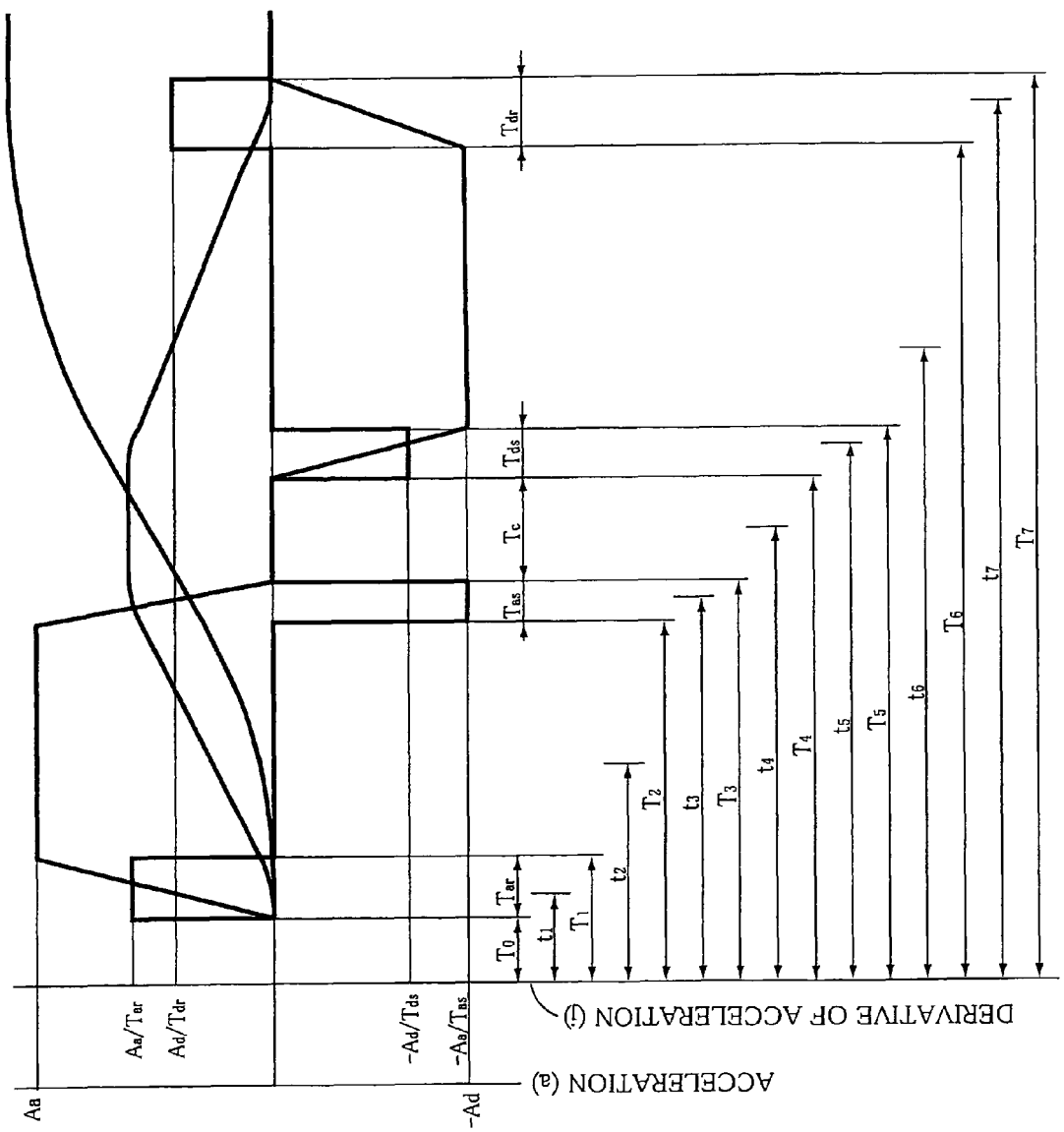
FIG. 7 is a graph for explaining an example of another control operation of the Y-axis drive motor by the control device.

Then, calculation of the letter-S position commands will be explained by reference to FIG. 7, in the case where the distance of movement from the first position to the second position is long enough for the acceleration "a", deceleration "−a" and speed "v" to reach their upper limits. In the case where the acceleration "a", deceleration "−a" and speed "v" do not reach their upper limits, the letter-S position commands can be calculated in the same manner as described below, except for the letter-S position commands during the period in which the derivative "j" or acceleration "a" is held at zero.

$T_{ar}$, $T_{as}$, $T_{ds}$, $T_{dr}$, $T_c$, $A_a$ and $A_d$ represent the following parameters:

$T_{ar}$: Acceleration increasing time of acceleration period
$T_{as}$: Acceleration decreasing time of acceleration period
$T_{ds}$: Acceleration decreasing time of deceleration period
$T_{dr}$: Acceleration increasing time of deceleration period
$T_c$: Constant movement period
$A_a$: Highest acceleration value during the acceleration period
$A_d$: Highest deceleration value during the deceleration period If "t" and "T" represent a time lapse from the moment of starting of the time measurement and the moments of the beginning and end of the following times $T_{ar}$, $T_{as}$, $T_{ds}$, $T_{dr}$, and period $T_c$, as indicated in FIG. 7, the derivatives "$j_1$" through "$j_7$" during the respective periods $T_1$-$T_7$ indicated in FIG. 7 are represented by the following equations, and the acceleration values "$a_1$" through "$a_7$", speeds "$v_1$" through "$v_7$" and positions "$p_1$" through "$p_7$" are obtained by sequential integration of the derivatives "$j_1$" through "$j_7$" with respect to the time "t".

$j_1: (A_a/T_a)+0(t_1-T_0)$ $a_1: (A_a/T_{ar})(t_1-T_0)+0$ $v_1: (A_a/T_a)(t_1-T_0)^2/2+0$ $p_1: (A_a/T_{ar})(t_1-T_0)^3/6+0$ $j_2: 0(t_2-T_1)$ $a_2: (t_2-T_1)+A_{T1}(=A_a)$ $v_2$: $A_{T1}(t_2-T_1)+V_{T1}$ $p_2$: $A_{T1}(t_2-T_1)^2/2+V_{T1}(t_2-T_1)+P_{T1}$ $j_3$: $(-A_a/T_{as})+0(t_3-T_2)$ $a_3$: $(-A_a/T_{as})(t_3-T_2)+A_{T2}(=A_a)$ $v_3$: $(A_a/T_{as})(t_3-T_2)^2/2+A_{T2}(t_3-T_2)+V_{T2}$ $p_3$: $(-A_a/T_{as})(t_3-T_2)^3/6+A_{T2}(t_3-T_2)^2/2+V_{T2}(t_3-T_2)+P_{T2}$ $j_4$: $0(t_4-T_3)$ $a_4$: $0(t_4-T_3)+A_{T3}(=0)$ $v_4$: $A_{T3}(t_4-T_3)+V_{T3}$ $p_4$: $V_{T3}(t_4-T_3)+P_{T3}$ $j_5$: $(-A_d/T_{ds})+0(t_5-T_4)$ $a_5$: $(-A_d/T_{ds})(t_5-T_4)+A_{T4}(=0)$ $v_5$: $(-A_d/T_{ds})(t_5-T_4)^2/2+V_{T4}$ $p_5$: $(-A_d/T_{ds})(t_5-T_4)^3/6+V_{T4}(t_5-T_4)+P_{T4}$ $j_6$: $0(t_6-T_5)$ $a_6$: $0(t_6-T_5)+A_{T5}(=-A_d)$ $v_6$: $-A_d(t_6-T_5)+V_{T5}$ $p_6$: $-A_d(t_6-T_5)^2/2+V_{T5}(t_6-T_5)+P_{T5}$ $j_7$: $(A_d/T_{dr})+0(t_7-T_6)$ $a_7$: $(A_d/T_{dr})(t_7-T_6)+A_{T6}(=-A_d)$ $v_7$: $(A_d/T_d)(t_7-T_6)^2/2+A_{T6}(t_7-T_6)+V_{T6}$ $p_7$: $(A_d/T_{dr})(t_7-T_6)^3/6+A_{T6}(t_7-T_6)^2/2+V_{T6}(t_7-T_6)+P_{T6}$

Therefore, $T_7-T_0$ represents a target movement time, which is a time allowed as the time of movement from the first position to the second position. A set of the letter-S position commands can be obtained as the positions $p_1$-$p_7$ including the first position $p_1$ (position from which the movement is initiated) and the second position $p_7$ (position at which the movement is terminated), by obtaining the times $T_{ar}$, $T_{as}$, $T_{ds}$, $T_{dr}$ and period $T_c$, and the highest acceleration value $A_a$ during the acceleration period and the highest deceleration value $A_d$ during the deceleration period.

Figure 8:
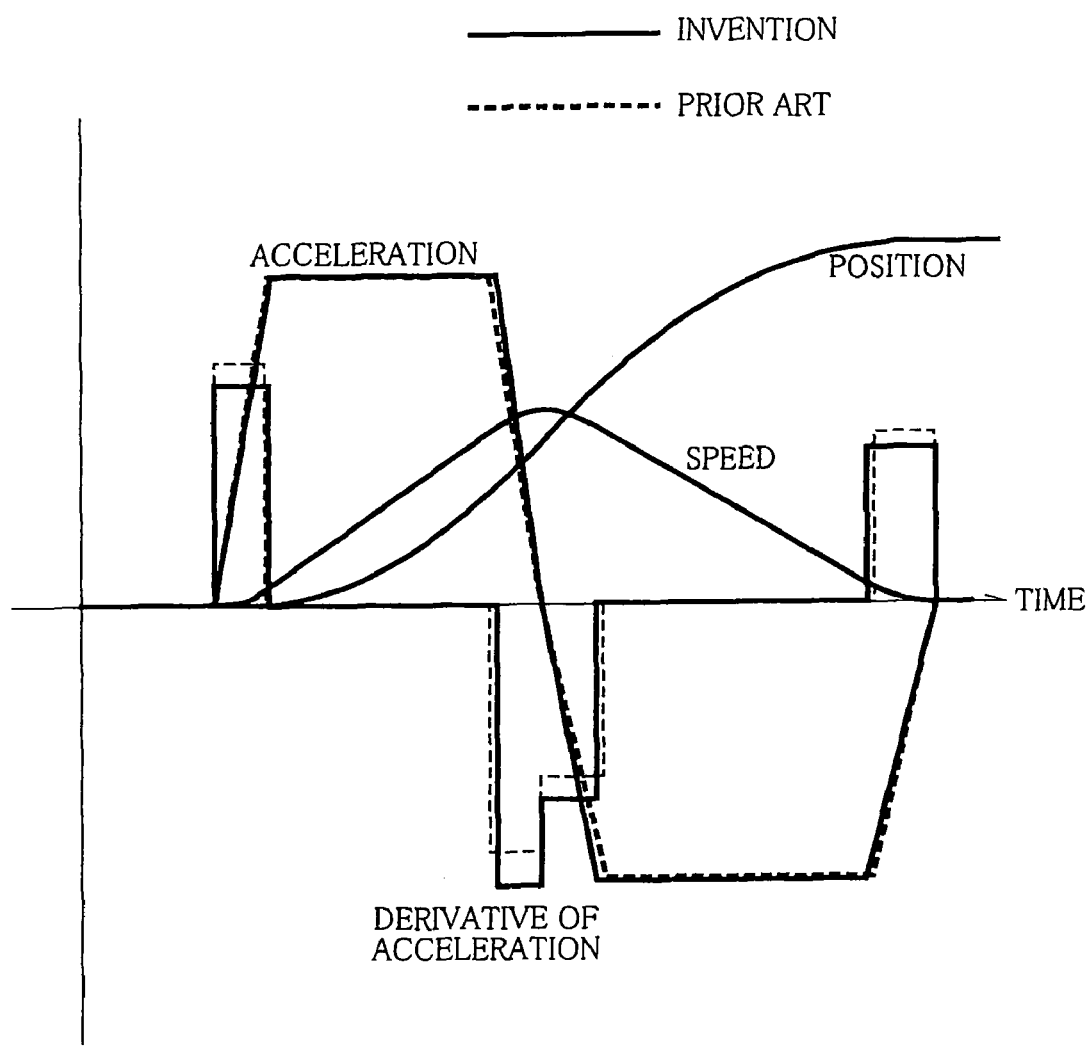
FIG. 8 is a graph indicating the control operation by the control device in an experiment conducted to confirm an advantage of the present invention.

An advantage of the present invention has been confirmed by experiments. One of the experiments will be described. In this experiment, a drive device to linearly move a slide was manufactured. The drive device includes a drive power source in the form of an AC servomotor, and a ballscrew rotated by the AC servomotor to move the slide. The AC servomotor was controlled according to the prior art, and according to the present invention, namely, such that the derivatives during the acceleration and deceleration are controlled symmetrically as in the prior art indicated by broken lines in FIG. 8, and such that the derivatives are controlled asymmetrically according to the present invention indicated by solid lines in FIG. 8. The following conditions were employed commonly in the control operation according to the prior art and the control operation according to the present invention:

| | |
|---|---|
| Moving distance: | 50 mm |
| Moving time: | 104.88 ms |
| Highest acceleration value: | 2.46 G |
| Highest deceleration value: | 2.05 G |
| Acceleration period: | 47.67 ms |
| Deceleration period: | 57.21 ms |

Constant-speed moving period: 0 ms

Conditions specific to the present invention are as follows:

| | |
|---|---|
| Acceleration increasing time during the acceleration period: | 8.33 ms |
| Acceleration decreasing time during the acceleration period: | 6.67 ms |
| Acceleration decreasing time during the deceleration period: | 8.00 ms |
| Acceleration increasing time during the deceleration period: | 10.00 ms |
| Acceleration derivative during the acceleration increasing time of the acceleration period: | 295 G/s |
| Absolute value of acceleration derivative during the acceleration decreasing time of the acceleration period: | 369 G/s |
| Absolute value of acceleration derivative during the acceleration decreasing time of the deceleration period: | 256 G/s |
| Acceleration derivative during the acceleration increasing time of the deceleration period: | 205 G/s |

Figure 9A:
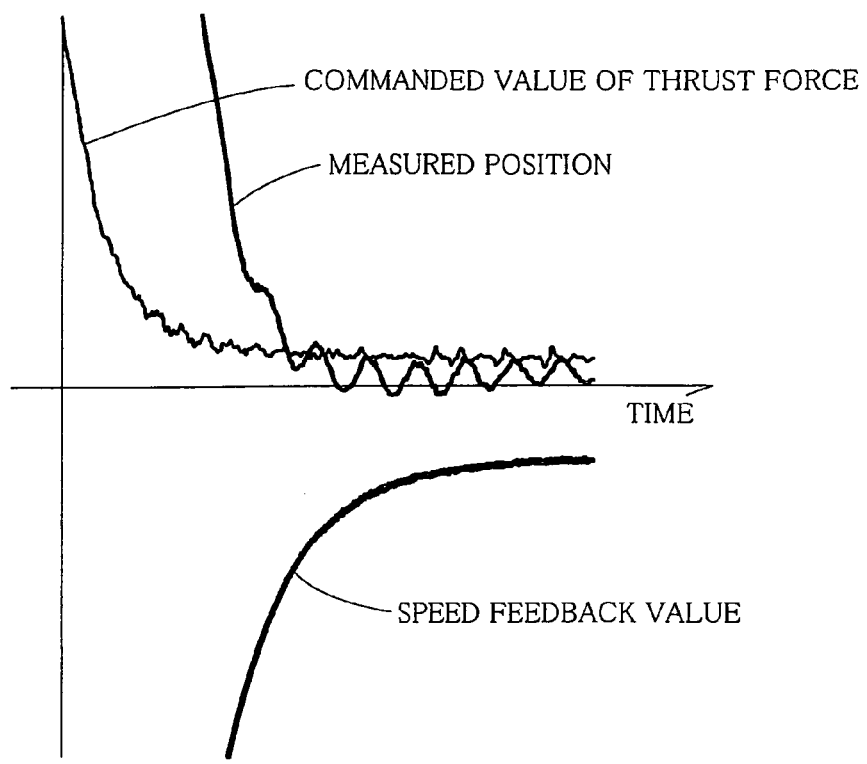
Figure 9B:
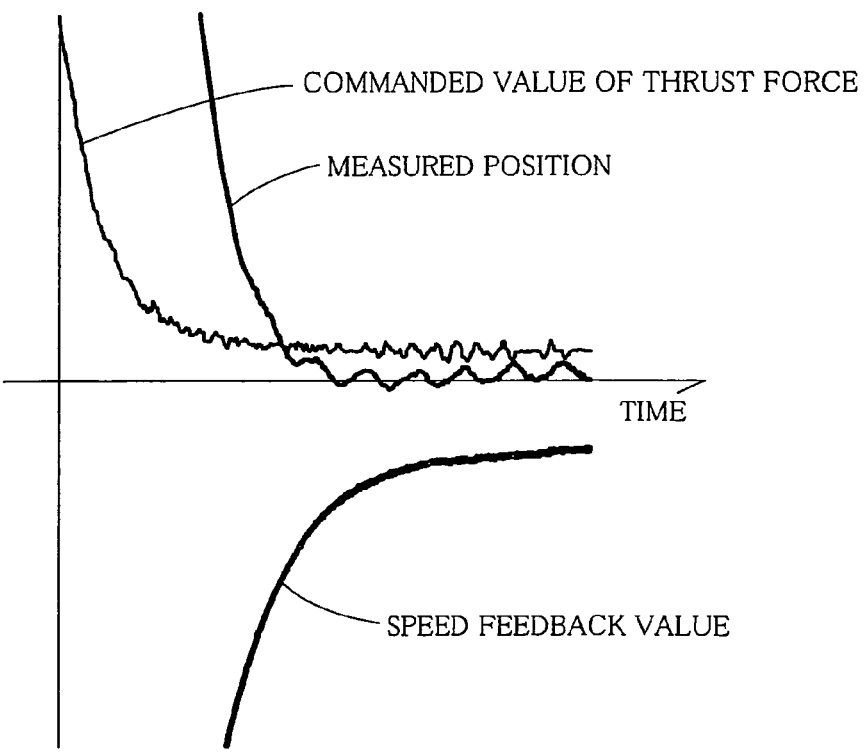
FIG. 9B is a graph indicating a result of an experiment according to the present invention.
Figure 10:
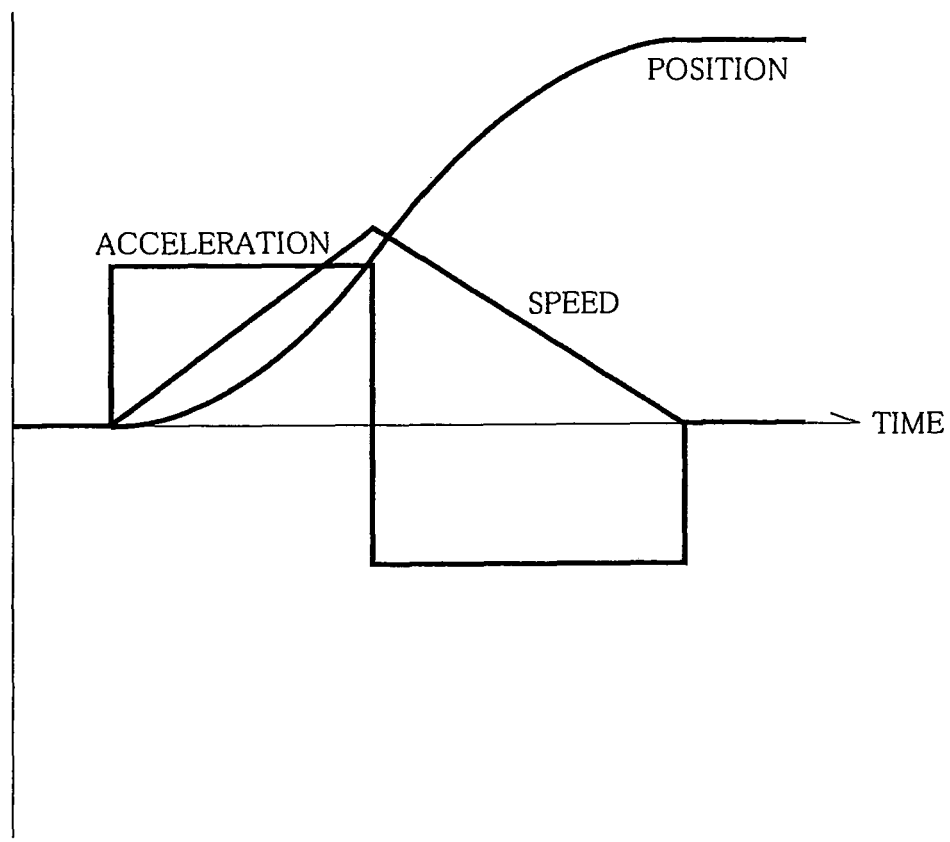
FIG. 10 is a graph indicating one example of a control operation according to a operation prior art control device.
Figure 11:
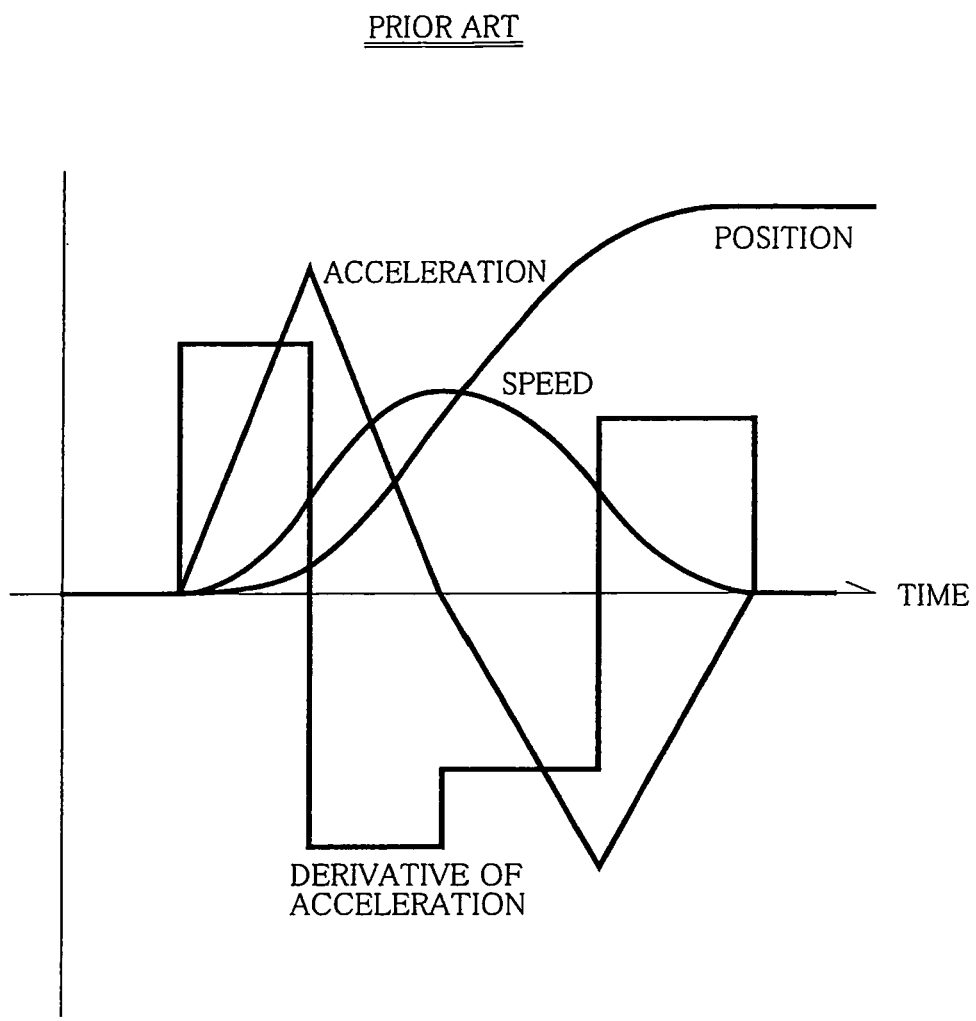
FIG. 11 is a graph indicating an example of another control operation according to the prior art control device.

The slide was moved under the above-indicated conditions, and a displacement of the slide near the second position at which the slide must be stopped was measured by a laser displacement measuring instrument. The measured displacement according to the prior art is indicated in FIG. 9A, while that according to the present invention is indicated in FIG. 9B. In the present invention, the amplitude of the vibrations of the slide near the second position was almost a half of that in the prior art. Thus, the advantage of the present invention was confirmed.

In FIGS. 9A and 9B, a commanded value of thrust force and a speed feedback value are indicated together with the measured position. A control device used in the experiment to command the AC servomotor was configured to generate thrust force commands in place of the position commands. In the experiment, the commanded value of thrust force and the speed feedback value as well as the output value of the laser displacement measuring instrument indicative of the measured position were recorded since it was possible to record the commanded thrust force and the speed feedback value.

In the illustrated embodiment described above, the derivative is held constant at a predetermined first value during the acceleration increasing time and at a predetermined second value during the acceleration decreasing time. However, the derivative need not be held constant, provided the derivative values during the acceleration increasing and decreasing times are controlled to be asymmetric with respect to each other, to enjoy the advantage of this invention. For example, the derivative is controlled to change along two sides of a triangle, a trigonometric function curve, a high-order function curve, etc., so that an integral value of the derivative during the acceleration increasing time is offset by an integral value of the derivative during the acceleration decreasing time, to enjoy the advantage of the present invention.

Further, the asymmetric control of the derivatives during the acceleration increasing and decreasing times need not be performed in both of the acceleration period and the deceleration period. That is, the principle of the present invention is satisfied when the asymmetric control according to the present invention is performed in each of at least one of the acceleration and deceleration periods.

In the illustrated embodiment, the control operations of the drive devices to move and rotate each of the component holder heads 50 of the component mounting machine are performed according to the present invention. However, the principle of the invention is applicable to other drive devices, for example to a drive device to move or rotate a syringe of an adhesive dispenser wherein the syringe accommodating an adhesive is held on the X-axis slide 60 in place of the component holder heads 50, and has a nozzle from which the adhesive is delivered to selected spots on a circuit board. Further, the present invention is applicable to the control operation of the drive device to move the fiducial-mark camera 120 to obtain the images of the fiducial marks, to the control operation of an inspecting device which has an inspection camera similar to the fiducial-mark camera 120 and which is arranged to obtain images of the circuit components 30 mounted on the printed-wiring board 20, for inspecting the mounting conditions of the circuit components 30, and to the control operation of an inspecting device which has an inspecting probe disposed on the X-axis slide 60 in place of the component holder heads 50 and which is arranged to move the inspecting probe to come into contact with selected areas or spots of the printed-wiring board 20, for electrical inspection of the printed-wiring board 20 after the circuit components 30 are mounted on the printed-wiring board 20.

The principle of this invention is equally applicable to multi-purpose robots, arm-type robots, and operating devices such as machine tools, as well as to the circuit-board working apparatus.

What is claimed is:

1. A method of controlling an operating member from a first position to a second position, comprising:
    initially increasing an operating speed of the operating member from zero while increasing an acceleration value of the operating member from zero and then decreasing the acceleration value to zero;
    subsequently decreasing the operating speed while decreasing the acceleration value from zero and then increasing the acceleration value to zero; and
    controlling a derivative of the acceleration value of the operating member such that the derivative during an acceleration increasing time during which the acceleration value is increased and the derivative during an acceleration decreasing time during which the acceleration value is decreased are asymmetric with respect to each other,
    wherein the derivatives during the acceleration increasing time and the acceleration decreasing time are controlled to be asymmetric with respect to each other, in each of at least one of an acceleration period during which the operating speed of the operating member is increased from zero, and a deceleration period during which the operating speed is decreased to zero.

2. The method according to claim 1, wherein an operation of controlling the derivative of the acceleration value of the operating member comprises at least one of a control arrangement to control the derivative of the acceleration value such that an absolute value of the derivative during the acceleration increasing time of the acceleration period is smaller than an absolute value of the derivative during the acceleration decreasing time of the acceleration period, and a control arrangement to control the derivative of the acceleration value such that an absolute value of the derivative during the acceleration increasing time of the deceleration period is smaller than an absolute value of the derivative during the acceleration decreasing time of the deceleration period.

3. The method according to claim 1, wherein an operation of controlling the derivative of the acceleration value of the operating member comprises holding the derivative constant at a predetermined first value during the acceleration increasing time and at a predetermined second value during the acceleration decreasing time.

4. The method according to claim 1, wherein an operation of controlling the derivative of the acceleration value of the operating member comprises controlling the acceleration value of the operating member such that a highest value of an absolute value of the acceleration value during the deceleration period is smaller than a highest value of an absolute value of the acceleration value during the acceleration period.

5. The method according to claim 1, wherein the operating member is a linearly movable member movable along a straight line, and the operating speed of the operating member is a linearly moving speed of the linearly movable member.

6. The method according to claim 1, wherein the operating member is a rotatable member rotatable about an axis, and the operating speed of the operating member is a rotating speed of the rotatable member.

7. An operating device comprising:
    an operating member operable to have a predetermined path of operation;
    a drive device including a drive source and operable to drive the operating member; and
    a control device configured to control the drive source for operating the operating member from a first position to a second position, such that an operating speed of the operating member is initially increased from zero while an acceleration value of the operating member is increased from zero and then decreased to zero, and is subsequently decreased while the acceleration value is decreased from zero and then increased to zero,
    wherein the control device includes an asymmetric control portion configured to control the drive source for controlling a derivative of the acceleration value of the operating member such that the derivative during an acceleration increasing time during which the acceleration value is increased and the derivative during an acceleration decreasing time during which the acceleration value is decreased are asymmetric with respect to each other,
    and wherein the asymmetric control portion controls the derivatives during the acceleration increasing time and the acceleration decreasing time to be asymmetric with respect to each other, in each of at least one of an acceleration period during which the operating speed of the operating member is increased from zero, and a deceleration period during which the operating speed is decreased to zero.

8. The operating device according to claim 7, wherein the asymmetric control portion has at least one of a control arrangement to control the derivative of the acceleration value of the operating member such that an absolute value of the derivative during the acceleration increasing time of the acceleration period is smaller than an absolute value of the derivative during the acceleration decreasing time of the acceleration period, and a control arrangement to control the derivative of the acceleration value such that an absolute value of the derivative during the acceleration increasing time of the deceleration period is smaller than an absolute value of the derivative during the acceleration decreasing time of the deceleration period.

9. The operating device according to claim 7, wherein the asymmetric control portion is configured to hold the derivative constant at a predetermined first value during the acceleration increasing time and at a predetermined second value during the acceleration decreasing time.

10. The operating device according to claim 7, wherein the asymmetric control portion is configured to control the acceleration value of the operating member such that a highest value of an absolute value of the acceleration value during the deceleration period is smaller than a highest value of an absolute value of the acceleration value during the acceleration period.

11. The operating device according to claim 7, wherein the operating member is a linearly movable member movable along a straight line, and the operating speed of the operating member is a linearly moving speed of the linearly movable member.

12. The operating device according to claim 7, wherein the operating member is a rotatable member rotatable about an axis, and the operating speed of the operating member is a rotating speed of the rotatable member.

13. A circuit-board working apparatus comprising:
a board holding device configured to hold a circuit board;
a working head configured to perform a working operation on the circuit board held by the board holding device; and
a moving device configured to move the working head and the circuit board held by the board holding device, relative to each other,
and wherein the moving device includes:
a movable member which holds one of the working head and the board holding device and which is movable to move said one of the working head and the board holding device;
a drive device including a drive source and operable to drive the movable member; and
a control device configured to control the drive source for moving the movable member from a first position to a second position, such that an operating speed of the movable member is initially increased from zero while an acceleration value of the movable member is increased from zero and then decreased to zero, and is subsequently decreased while the acceleration value is decreased from zero and then increased to zero,
wherein the control device includes an asymmetric control portion configured to control the drive source for controlling a derivative of the acceleration value of the movable member such that the derivative during an acceleration increasing time during which the acceleration value is increased and the derivative during an acceleration decreasing time during which the acceleration value is decreased are asymmetric with respect to each other,
and wherein the asymmetric control portion controls the derivatives during the acceleration increasing time and the acceleration decreasing time to be asymmetric with respect to each other, in at least one of an acceleration period during which the operating speed of the operating member is increased from zero, and a deceleration period during which the operating speed is decreased to zero.

14. The circuit-board working apparatus according to claim 13, wherein the asymmetric control portion has at least one of a control arrangement to control the derivative of the acceleration value of the movable member such that an absolute value of the derivative during the acceleration increasing time of the acceleration period is smaller than an absolute value of the derivative during the acceleration decreasing time of the acceleration period, and a control arrangement to control the derivative of the acceleration value such that an absolute value of the derivative during the acceleration increasing time of the deceleration period is smaller than an absolute value of the derivative during the acceleration decreasing time of the deceleration period.

15. The circuit-board working apparatus according to claim 13, wherein the asymmetric control portion is configured to hold the derivative constant at a predetermined first value during the acceleration increasing time and at a predetermined second value during the acceleration decreasing time.

16. The circuit-board working apparatus according to claim 13, wherein the asymmetric control portion is configured to control the acceleration value of the movable member such that a highest value of an absolute value of the acceleration value during the deceleration period is smaller than a highest value of an absolute value of the acceleration value during the acceleration period.

17. The circuit-board working apparatus according to claim 13, wherein the movable member is a linearly movable member movable along a straight line, and the operating speed of the movable member is a linearly moving speed of the linearly movable member.

18. The circuit-board working apparatus according to claim 13, wherein the movable member is a rotatable member rotatable about an axis, and the operating speed of the movable member is a rotating speed of the rotatable member.

19. The circuit-board working apparatus according to claim 13, wherein the working head is a mounting head configured to mount electronic circuit components on the circuit board held by the board holding device, and the movable member includes at least one of (a) a first movable member movable in one of an X-axis direction and a Y-axis direction, in a plane parallel to a plane of the circuit board held by the board holding device, and (b) a second movable member which is movable on the first movable member, in the other of the X-axis and Y-axis directions, and which holds the mounting head,
and wherein the drive device of the moving device drives said at least one of the first and second movable members, and the asymmetric control portion controls the drive source of the drive device.

* * * * *